United States Patent [19]
Montana et al.

[11] 3,818,561
[45] June 25, 1974

[54] CUT-OFF SAW AND SLOTTING CUTTER

[75] Inventors: Francis J. Montana, Farmington; James A. Pawlik, Sterling Heights, both of Mich.

[73] Assignee: The Valeron Corporation, Detroit, Mich.

[22] Filed: July 14, 1971

[21] Appl. No.: 162,484

[52] U.S. Cl. ............... 29/95 R, 29/95 B, 29/105 R, 29/96, 83/836, 83/840, 144/241
[51] Int. Cl. ............................................. B26d 1/00
[58] Field of Search ........ 29/105 R, 95 B, 95 R, 96; 143/144; 144/241

[56] References Cited
UNITED STATES PATENTS

| | | | |
|---|---|---|---|
| 2,950,524 | 8/1960 | Frommelt et al. | 29/96 |
| 3,466,720 | 9/1969 | Stier | 29/95 |
| 3,490,117 | 1/1970 | Hertel | 29/96 |
| 3,541,655 | 11/1970 | Stier | 29/95 |
| 3,576,061 | 4/1971 | Pahlitzsch | 29/105 |

*Primary Examiner*—Leonidas Vlachos
*Attorney, Agent, or Firm*—Farley, Forster and Farley

[57] ABSTRACT

The invention comprises an improved multiple toothed slotting cutter and cut-off saw which utilizes replaceable and indexable inserts of a novel configuration retained by mechanical fastening means and novel insert locating means. Each insert has a narrow cutting edge and a wide cutting edge and in combination with the locating means can be positioned for a narrow cut at a slightly larger radius than the broad cut. In the preferred embodiment, the inserts are alternately positioned for wide and narrow cut around the periphery of the cutter, thus providing a very efficient configuration for a cut-off saw. When the insert cutting edges are dulled the inserts are merely reversed end for end to provide fresh cutting edges with the same alternating positions.

19 Claims, 11 Drawing Figures

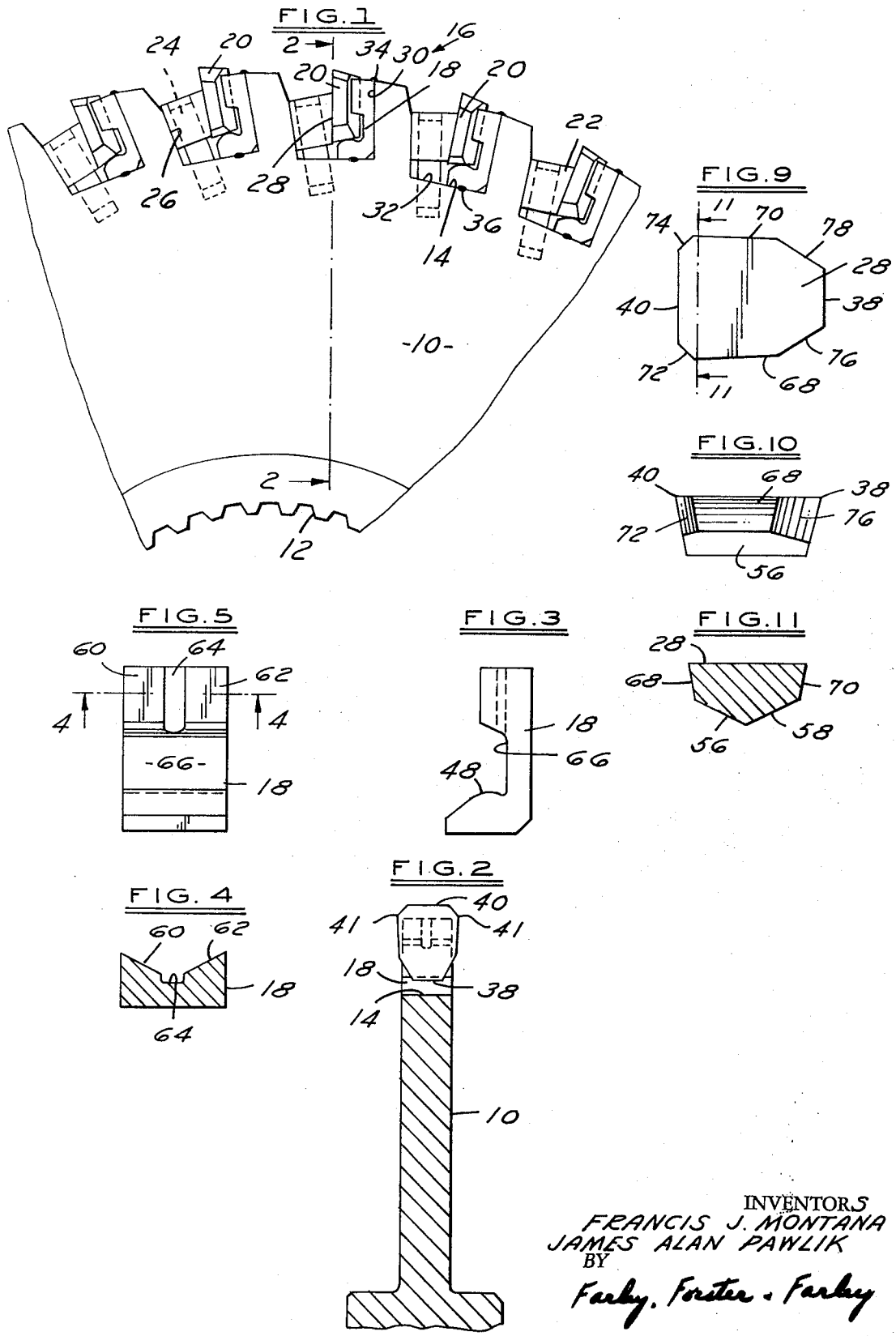

PATENTED JUN 25 1974 3,818,561

INVENTORS
FRANCIS J. MONTANA
JAMES ALAN PAWLIK
BY
Farley, Forster & Farley
ATTORNEYS

CUT-OFF SAW AND SLOTTING CUTTER

BACKGROUND OF THE INVENTION

The invention pertains to the field of slotting cutters and cut-off saws wherein each cutter comprises a rotating disc with a plurality of cutting teeth mounted around the periphery. The cutting teeth are set for a width of cut greater than the thickness of the disc thereby providing the necessary clearance for the disc as it cuts through the workpiece. Commonly, the discs are mounted in gangs on a single shaft and separated the proper distance for cutting a plurality of parts from a common work piece. As an example, a plurality of bearing caps may be poured as one single casting, and a gang of cut-off saws used to cut all of the bearing caps in one operation.

The most common prior art slotting cutters comprise discs having a plurality of cutting teeth made from a hard material, brazed into slots in the periphery of the disc. When the cutting teeth have become dull from use or individual cutting teeth have been damaged, the disc must be discarded or all of the teeth removed by reheating the disc to melt out the brazing material. Slotting cutters have been made utilizing the throwaway inserts and mechanical fastening means. However, these cutters have tended to be bulky in width and therefore wasteful of more material than necessary.

SUMMARY OF THE INVENTION

The invention comprises an improved combination of the cutting insert and locating means mounted on the periphery of a slotting cutter disc or cut-off saw. Locating means for the inserts are positioned in slots cut into the periphery of the cutter disc. The locating means are preferably tack welded into place, although other attachment means may be utilized. Each cutting insert has a narrow cutting edge at one end and a broad cutting edge at the other end. Different relief angles are employed for the respective cutting edges. When the insert is positioned in the locating means, the relief angle surface abuts an arcuate surface in the locating means. Differing relief angles will abut different portions of the arcuate surface thereby changing the outer cutting edge radius with respect to the cutter. A shallow "V" shaped surface on the back face of the insert and complementary surface in the locating means provides for lateral positioning of the insert.

DESCRIPTION OF THE DRAWINGS

FIG. 1 is a fragmentary side view of a cutter disc showing several of the cutting insert assemblies;

FIG. 2 is a partial section taken along the line 2—2 of FIG. 1.

FIG. 3 is a side view of the locating means;

FIG. 4 is a section of the locating means taken along the line 4—4 of FIG. 5.

FIG. 5 is a front view of the locating means;

FIG. 9 is a face view of the insert;

FIG. 10 is a side view of the insert; and,

FIG. 11 is a section of the insert taken along the line 11—11 of FIG. 9.

DESCRIPTION OF THE PREFERRED EMBODIMENT

Figure 6:
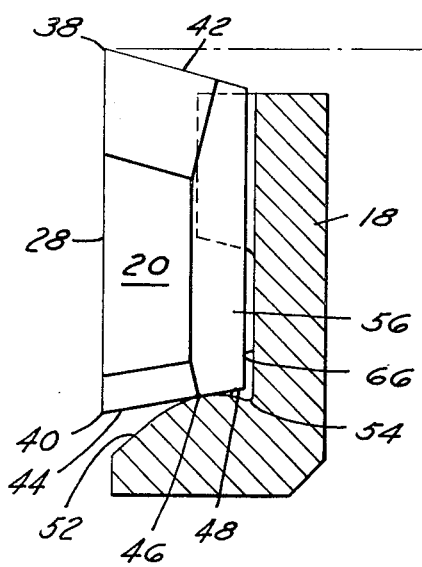
FIG. 6 is a section of the locating means and the cutting insert positioned therein with the narrow cutting edge in cutting position.

In FIG. 1, a cutter disc 10 having an internal spline 12 for driving attachment to a drive shaft is shown. About the periphery of the cutter disc 10 are a plurality of slots 14, several of which are shown. Positioned in the slots, are cutting insert assemblies generally denoted by 16. Typically, 50 to 100 such assemblies 16 may be provided on a cutter disc, depending principally upon the diameter of the cutter disc. The assemblies 16 comprise a locating means 18, cutting insert 20 and wedge means 22. The wedge 22 is mechanically fastened in place by a screw fastener 24 such as an Allen head screw. The wedge 22 abuts the sidewall 26 of the groove 14 and the face 28 of the insert 20 to provide the wedging action. The locating means 18 abuts the side 30 and the bottom 32 of the groove 14. As shown, the locating means 18 is tack welded at 34 and 36 to the cutter disc 10. However, brazing or other permanent fastening means may be utilized to retain the locating means in position. The positioning of the cutting insert 20 in the locating means 18 will be described in more detail below.

In FIG. 2, the cutter disc 10 is shown with the cutting insert 20 in position. The wide cutting edge 40 is in cutting position with the narrow cutting edge 38 below. The maximum insert width is denoted by 41 and is greater than the cutter disc thickness.

In FIGS. 3, 4 and 5, the locating means includes surfaces 60 and 62 joined by a clearance groove 64 in the center. An arcuate contact surface 48 is provided to support the insert 20 as described below.

Figure 7:
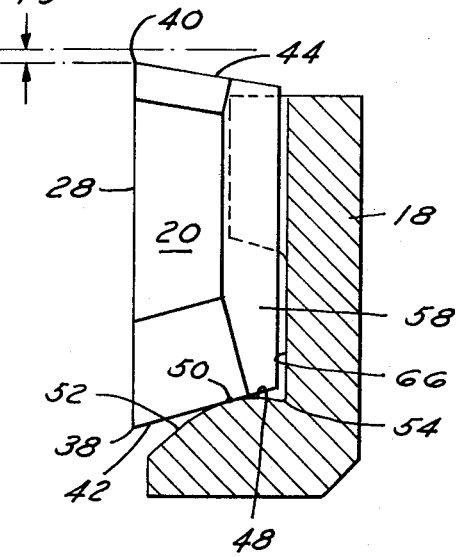
FIG. 7 is a section of the locating means and the cutting insert positioned therein with the wide cutting edge in cutting position.
Figure 8:
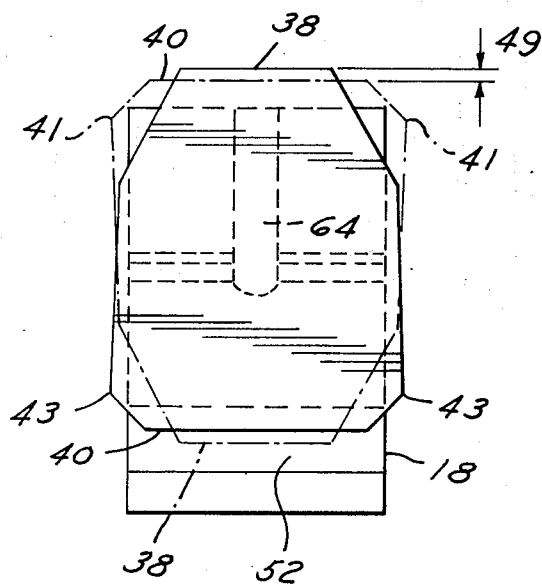
FIG. 8 is a superposition of the alternate cutting insert positions in the locating means.

In FIGS. 6, 7 and 8, the locating means 18 is shown with the insert in either of the two alternate positions. Both positions are shown superposed in FIG. 8. With the narrow cutting edge 38 in cutting position the wide cutting edge 40 is adjacent the lower portion of the locating means 18 with the adjacent cutting insert end 44 in contact at 46 with the arcuate contact surface 48 of the locating means 18. In the alternate position with the wide cutting edge 40 in cutting position, the end surface 42 adjacent the narrow cutting edge 38 will contact the arcuate surface 48 at 50 which is to the left of 46. The arcuate surface 48 is typically cylindrical and the contact at 46 or 50 will be along an element of the cylinder and parallel with the axis of the cutter disc. The end 42 provides a steeper relief angle for the cutting edge 38 than the end 42 behind the cutting edge 40. The differing contacts 46 and 50 on the surface 48 provide for the alternate cutting radii of the cutting edges 38 and 40 indicated by the difference in elevation 49. A chamfer 52 and depression 54 are formed in the locating means 18 to ensure clearance with the cutting insert 20. The back side of the insert 20 is provided with two surfaces 56 and 58 which form a shallow "V" shape to engage the complementary surfaces 60 and 62 on the locating means 18. Clearance at the center of the "V" is provided by the groove 64 in the locating means 18. Additional clearance is provided by the cutaway 66 transversely across the locating means 18. Other engageable complementary surfaces may be provided to perform the lateral locating function.

In FIGS. 9, 10 and 11, the cutting insert 20 is shown. The sides of the insert 68 and 70 are tapered back to provide side relief for the cutting edges 38 and 40 and tapered toward the cutting edge 38 to provide further edge relief for the wide cutting edge 40. To eliminate sharp corners from the cutting insert, chamfers are provided at 72 and 74 for the wide cutting edge 40 and 76 and 78 for the narrow cutting edge 38. The larger chamfers 76 and 78 provide a narrower and more effective narrow cutting edge 38 without unduly weakening the insert. As noted above, the maximum width of the cutting insert 20 is shown at 41 to be greater than the width of the cutting disc 10, except for the hub. The cutting insert with the narrow cutting edge 38 extended will have its maximum width nearer the axis of the cutting disc which gives rise to the maximum width at 43. Typically, the cutter discs are set up with the narrow cutting edges 38 and wide cutting edges 40 alternating around the periphery of the cutter. However, other patterns may be utilized when desired. When the cutting edges 38 and 40 are worn down, the inserts are each reversed in position to bring fresh cutting edges 38 and 40 into place since each cutting insert is provided with a narrow cutting edge 38 and wide cutting edge 40. The cutting insert 20 and locating means 18 eliminates the need for two non-alike inserts previously necessary to provide the alternating narrow and wide cutting edges of the cut-off saw. Each insert is merely reversed end for end when dull to provide fresh cutting surfaces in the same alternating pattern.

As best seen in FIG. 8, the configuration and alternating inversion of cutter position results in the cutters with FIG. 6 position removing stock at the center while those with FIG. 7 position remove the stock at the corners thus reducing by approximately one-half the length of cutting edge subjected to chip loading, as compared to the use of identical cutters, while retaining a balanced loading free of lateral cutter stresses as in the case of oppositely offset alternate tooth forms. More efficient, higher speed and feed cutting is thus accommodated as well as the indexable feature.

Alternatively, for certain applications the inserts may be made with equal size cutting edges on both ends. Narrow cuts may be made utilizing a relatively thin cutter disc but retaining the indexability and accuracy of positioning accomplished with the locating surface on the back of the insert.

Tack welding of the anvils to the disc body provides a fastening means compatible with minimum width of disc and cutters since adequate strength and rigidity is provided without the allowance of extra stock for threaded fastening elements. Since the wedge retaining elements are not subjected to cutting loads, the screw fasteners may be of relatively light construction consistent with narrow disc and cutter design.

We claim:

1. A cutting insert for use in a cutting tool comprising a body having a face, a relatively wide cutting end on the body, a relatively narrow opposite cutting end on the body, each end intersecting the face at an acute relief angle to provide each cutting edge and relief therebehind, the relief angles being different.

2. The cutting insert of claim 1 wherein the relief angle behind the narrow cutting end is greater than the relief angle behind the wide cutting end.

3. The cutting insert of claim 1 wherein the body includes a surface opposite the face adapted to position the insert laterally in a cutting tool.

4. The cutting insert of claim 1 wherein the body includes sides intersecting the face at an acute angle to provide side relief therebehind, each side intersection forming an acute angle with the wide cutting end to provide clearance therebelow.

5. The cutting insert of claim 4 wherein the intersections of the ends with the sides are chamfered.

6. A cutting insert for use in a cutting tool comprising a body having a face and ends, each end intersecting the face at an acute relief angle to provide a cutting edge and relief therebehind at each end, sides on the body intersecting the face at an acute angle to provide side relief therebehind, both side intersections forming acute angles with one of the cutting edges to provide a relatively wide cutting edge and the other cutting edge at obtuse angles to provide a relatively narrow cutting edge, a greater relief angle provided behind the narrow cutting edge than behind the wide cutting edge, chamfers provided at the intersections of the sides with the ends, and a surface opposite the face for positioning the insert laterally in a cutting tool.

7. An improved cutter assembly comprising a cutting insert, locating means engageable with the cutting insert and fastening means to retain the cutting insert in engagement with the locating means, the improvement characterized by a face on the cutting insert, opposite ends of the cutting insert forming different acute angles with the face, and an arcuate surface on the locating means engageable with one of the ends of the cutting insert thereby determining the extension of the opposite end beyond the locating means.

8. An improved cutter assembly comprising a cutting insert, locating means engageable with the cutting insert, and fastening means to retain the cutting insert in engagement with the locating means, the improvement characterized by a face on the cutting insert, opposite ends of the cutting insert intersecting the face with different acute angles to form cutting edges with different cutting relief therebehind, and an arcuate surface on the locating means engageable with one of the ends of the cutting insert thereby determining the extension of the opposite end and adjacent cutting edge beyond the locating means.

9. The cutter assembly of claim 8 wherein one cutting edge is wide relative to the opposite cutting edge and the relief angle behind the wide cutting edge is less than the relief angle behind the narrow cutting edge.

10. The cutter assembly of claim 9 wherein the narrow cutting edge when in cutting position extends further beyond the locating means than the wide cutting edge when in cutting position.

11. The cutter assembly of claim 9 wherein the insert includes sides intersecting the face at an acute angle to provide side relief therebehind, the sides tapering apart from the narrow cutting edge to the wide cutting edge to provide side clearance below the wide cutting edge.

12. The cutter assembly of claim 8 wherein the insert includes a surface opposite to the face and the locating means includes a surface complementary to the surface of the insert adapted to laterally position the insert relative to the locating means.

13. A slotting cutter comprising a cutter disc, and a plurality of cutter assemblies mounted about the periphery of the cutter disc, wherein at least one of said cutter assemblies comprises a cutting insert, locating means engageable with the cutting insert, fastening means to retain the cutting insert in engagement with the locating means, a face on the cutting insert, opposite ends of the cutting insert intersecting the face with different acute angles to form cutting edges with different cutting relief therebehind, and an arcuate surface on the locating means engageable with one of the ends of the cutting insert thereby determining the extension of the opposite end and adjacent cutting edge beyond the locating means.

14. The slotting cutter of claim 13 wherein the locating means of the cutter assembly are tackwelded to the cutter disc.

15. The slotting cutter of claim 13 wherein the fastening means comprise mechanical means engaging the cutter disc and cutting insert.

16. The slotting cutter of claim 13 including a plurality of said cutting inserts each having one cutting edge wide relative to the opposite cutting edge and the relief angle behind the wide cutting edge less than the relief angle behind the narrow cutting edge, said cutting inserts being positioned with the wide cutting edges alternating with the narrow cutting edges in cutting position about the slotting cutter.

17. A cutting tool comprising a body, a plurality of identical locating means in said body, a plurality of identical unsymmetrical indexable cutting inserts adapted for simultaneous installations in different indexed positions in said locating means to respectively effect different fractional portions of stock removal, and to exchange said fractional portions by exchange of the indexed position of said cutting inserts, and means for retaining said cutting inserts in any of the different indexable positions.

18. A rotary slitting or cut-off saw comprising a disc having a central drive hub, a plurality of transverse slots in the perimeter of said disc, a plurality of identical locating means seated in said slots, a plurality of identical unsymmetrical indexable cutting inserts adapted for simultaneous use in different indexed position in said locating means to respectively effect different portions of stock removal during a slitting or cut-off operation, and to exchange said fractional portions by exchange of the indexed position of said respective cutting inserts, and means for retaining said cutting inserts in any of the different indexable positions.

19. The cutting tool as set forth in claim 18 wherein said locating means are tack welded to said disc.

* * * * *